US010514681B2

United States Patent
Aizawa et al.

(10) Patent No.: US 10,514,681 B2
(45) Date of Patent: Dec. 24, 2019

(54) NUMERICAL CONTROLLER INCLUDING OVERLAP FUNCTION BETWEEN ARBITRARY BLOCKS BY COMMON ACCELERATION/DECELERATION CONTROL UNIT

(71) Applicant: FANUC Corporation, Minamitsuru-gun, Yamanashi (JP)

(72) Inventors: Nobuaki Aizawa, Minamitsuru-gun (JP); Kunihiro Honma, Minamitsuru-gun (JP); Nobuhito Oonishi, Minamitsuru-gun (JP)

(73) Assignee: FANUC Corporation, Minamitsuru-gun, Yamanashi (JP)

( * ) Notice: Subject to any disclaimer, the term of this patent is extended or adjusted under 35 U.S.C. 154(b) by 190 days.

(21) Appl. No.: 14/860,975

(22) Filed: Sep. 22, 2015

(65) Prior Publication Data
US 2016/0103446 A1    Apr. 14, 2016

(30) Foreign Application Priority Data
Oct. 14, 2014    (JP) .................................. 2014-209889

(51) Int. Cl.
     *G05B 19/416*    (2006.01)
     *G05B 19/19*    (2006.01)

(52) U.S. Cl.
CPC .. *G05B 19/416* (2013.01); *G05B 2219/34083* (2013.01)

(58) Field of Classification Search
CPC ............... G05B 19/416; G05B 2219/34083
See application file for complete search history.

(56) References Cited

U.S. PATENT DOCUMENTS

| 5,373,221 | A |   | 12/1994 | McGee et al. | |
|---|---|---|---|---|---|
| 5,477,117 | A | * | 12/1995 | Saito | B23Q 7/007 198/460.1 |
| 5,859,516 | A |   | 1/1999 | Müller et al. | |
| 5,888,037 | A | * | 3/1999 | Fujimoto | G05B 19/416 408/1 R |

(Continued)

FOREIGN PATENT DOCUMENTS

| CN | 101609326 A | 12/2009 |
|---|---|---|
| JP | H02-40701 A | 2/1990 |

(Continued)

OTHER PUBLICATIONS

Notification of Reasons for Refusal dated Dec. 8, 2015 in Japanese Patent Application No. 2014-209889 (3 pages) with an English Translation (3 pages).

(Continued)

*Primary Examiner* — Brian W Wathen
*Assistant Examiner* — Brian T McMenemy
(74) *Attorney, Agent, or Firm* — Drinker Biddle & Reath LLP

(57) ABSTRACT

A numerical controller carries out acceleration/deceleration control over an interpolation pulse produced based on command blocks. This numerical controller exercises acceleration/deceleration control processing over the interpolation pulse based on an acceleration/deceleration setting which corresponds to the command blocks, and outputs a first speed pulse. The numerical controller exercises acceleration/deceleration control processing over the first speed pulse such that command blocks overlap each other, based on an overlapping shared acceleration/deceleration setting which does not depended on the command blocks, and outputs a second speed pulse.

5 Claims, 8 Drawing Sheets

(56) References Cited

U.S. PATENT DOCUMENTS

| | | | | |
|---|---|---|---|---|
| 5,911,125 | A * | 6/1999 | Fujibayashi | G05B 19/416 318/567 |
| 2004/0129688 | A1 * | 7/2004 | Mori | B23K 26/06 219/121.61 |
| 2009/0062955 | A1 * | 3/2009 | Ide | G05B 19/4061 700/178 |
| 2009/0315502 | A1 | 12/2009 | King et al. | |
| 2010/0179690 | A1 * | 7/2010 | Matthias | B25J 9/1676 700/253 |
| 2012/0192999 | A1 * | 8/2012 | Khan | B23K 26/0006 148/402 |
| 2012/0296475 | A1 * | 11/2012 | Maekawa | B23Q 15/12 700/275 |
| 2014/0058367 | A1 * | 2/2014 | Dantus | H01S 3/005 606/6 |
| 2016/0091886 | A1 * | 3/2016 | Sato | G05B 19/416 700/188 |

FOREIGN PATENT DOCUMENTS

| | | | |
|---|---|---|---|
| JP | H03-248207 A | 11/1991 | |
| JP | H04-169907 A | 6/1992 | |
| JP | H07-20922 A | 1/1995 | |
| JP | 2004-252814 A | 9/2004 | |
| WO | WO-96/15482 A1 | 5/1996 | |
| WO | WO-2014184820 A1 * | 11/2014 | ........... G05B 19/416 |

OTHER PUBLICATIONS

The Notification of the First Office Action dated Apr. 25, 2017 in Chinese Patent Application No. 2015106611959 (5 pages) with an English translation (7 pages).

Weck et al., "Werkzeugmaschinen [machine tools]—Fertigungssysteme [manufacturing systems]. Bd. vol. 4. Automatisierung von Maschinen und Anlagen [automation of machines and systems]" 6., neu bearb. Aufl. [reworked edition] Berlin [u.a.]: Springer, 2006 (Studium und Praxis) [Studies and practice]. pp. 289-290, 299-302. ISBN [international Standard Book No.] 3-540-22507-2; 978-3-22507-2.

Office Action dated Oct. 5, 2018 in German Patent Application No. 10 2015 012 973.2 (5 pages) with an English translation (5 pages).

* cited by examiner

--Prior Art--

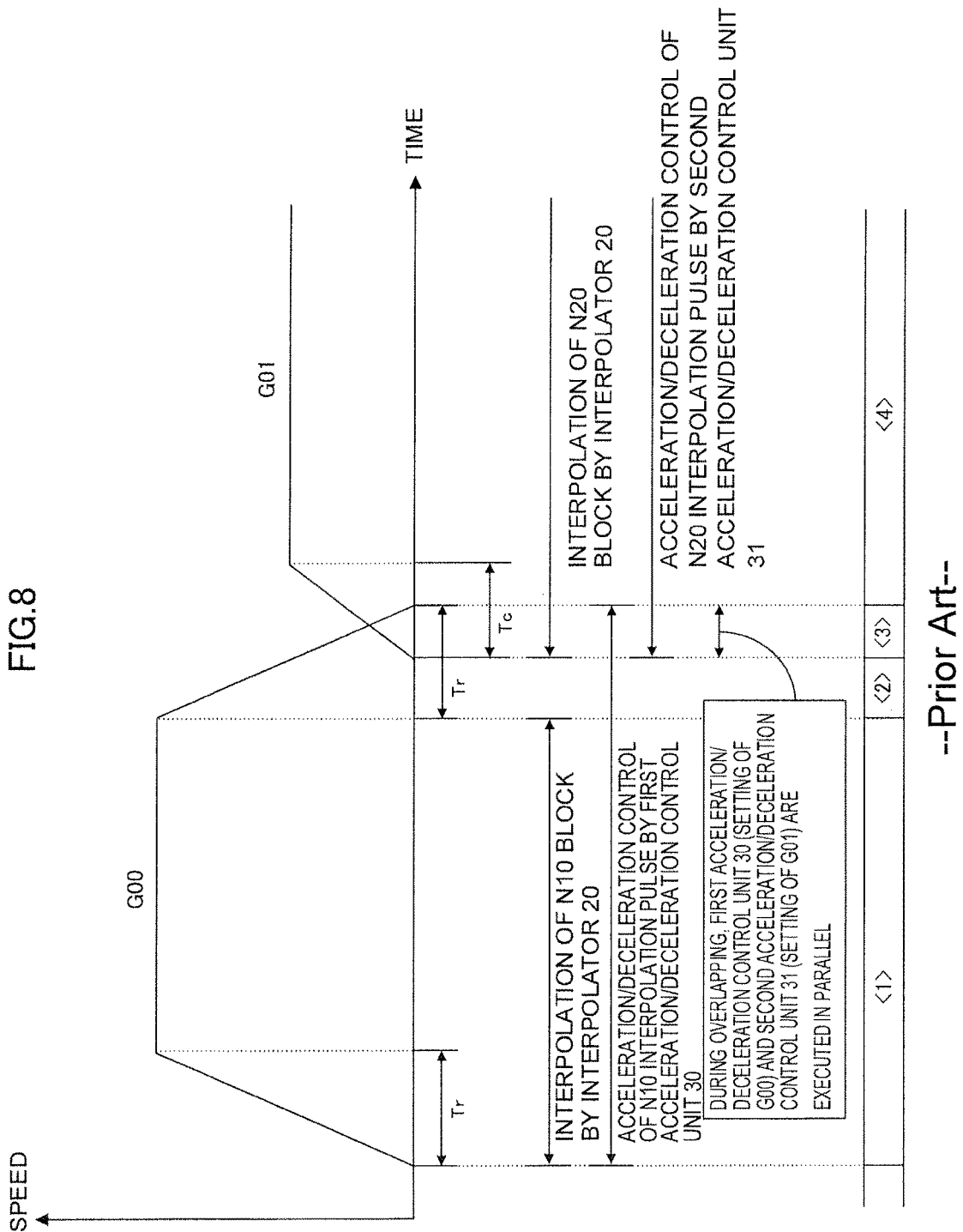
FIG.8 --Prior Art--

NUMERICAL CONTROLLER INCLUDING OVERLAP FUNCTION BETWEEN ARBITRARY BLOCKS BY COMMON ACCELERATION/DECELERATION CONTROL UNIT

RELATED APPLICATION DATA

This application claims priority under 35 U.S.C. § 119 and/or § 365 to Japanese Application No. 2014-209889 filed Oct. 14, 2014, the entire contents is incorporated herein by reference.

BACKGROUND OF THE INVENTION

1. Field of the Invention

The present invention relates to a numerical controller, and more particularly, to a numerical controller including an overlap function between arbitrary blocks by a common acceleration/deceleration control unit.

2. Description of the Related Art

When a machining program is executed by a numerical controller, the following technique is generally used. That is, as shown in FIG. 5, moving commands of blocks included in a CNC command 100 such as the machining program are analyzed by a command analysis unit 10, interpolation process is executed by an interpolator 20 based on command data concerning movement of a drive unit (not shown) obtained as a result of the analysis, an interpolation pulse distributed by the interpolation process is subjected to acceleration/deceleration processing by an acceleration/deceleration control unit 30, and based on a result thereof, a drive unit such as a servomotor is controlled by a servo control unit 40. To suppress vibration generated by large acceleration, there is also widely known such a technique that a plurality of acceleration/deceleration control units 30 and 31 are provided in series as shown in FIG. 6, and acceleration/deceleration processing is executed in two stages to slow down (bell-shaped acceleration/deceleration) acceleration.

In execution of continuous blocks when a machining program is executed by a numerical controller, interpolation process and acceleration/deceleration processing of a moving command of a next block is started after interpolation process and acceleration/deceleration processing of a moving command of a block which is currently executed is completed. Whereas, there is also such a process method that the interpolation process and the acceleration/deceleration processing of a moving command of a next block are started after the interpolation process of a moving command of a block which is currently executed is completed and when the acceleration/deceleration processing is not yet completed. According to this method, since moving commands of two blocks are output in a state where the moving commands overlap each other, a tool path which is completely attuned to a machining program is not obtained, but distribution of a next block is started earlier, and correspondingly, machining time can be shortened.

When moving commands of the continuous two blocks overlap each other by this method, the acceleration/deceleration processing of the previous block and the next block are carried out by the same acceleration/deceleration control unit while the moving commands of the continuous two blocks overlap each other. Hence, there is a problem that the moving commands cannot overlap each other if a setting of the respective acceleration/deceleration of the previous and next two overlap blocks are different from each other. Here, JP 04-169907 A, for example discloses a technique for solving this problem by providing a plurality of acceleration/deceleration control units 30 and 31 in parallel (not in series) as shown in FIG. 7, and by executing the acceleration/deceleration control units 30 and 31 in parallel when moving commands of blocks overlap each other.

An example of overlapping processing between two blocks having different settings of acceleration/deceleration described in JP 04-169907 A will be described using FIG. 8.

A numerical controller 1 which carries out the overlapping processing shown in FIG. 8 has an acceleration/deceleration time constant Tr of a rapid traverse command (G00) and an acceleration/deceleration time constant Tc of a cutting feed command (such as G01 and G02 and G03), and acceleration/deceleration types of previous and next two blocks are set to linear acceleration/deceleration. FIG. 8 is a timing chart showing operations of an interpolator 20 and first and second acceleration/deceleration control units 30 and 31, and outputs of the acceleration/deceleration control units 30 and 31 when an N10 block and an N20 block overlap each other when the numerical controller 1 controls a machine tool based on a later-described program O0001.

O0001;
N10 G00 X100.;
N20 G01 X150. F500.;
M30;

First, for a command of the N10 block analyzed in the command analysis unit 10, forming operation of an interpolation pulse is started by the interpolator 20. The acceleration/deceleration control unit 30 forms the acceleration/deceleration time constant Tr and the acceleration/deceleration type into linear shapes based on the setting, an output of the interpolator 20 is subjected to the acceleration/deceleration control processing, and a speed pulse is produced (see <1> in FIG. 8).

The output of the interpolation pulse of the N10 block is completed in the interpolator 20. At this time, the acceleration/deceleration control unit 30 is executing the acceleration/deceleration control (see <2> in FIG. 8).

Forming operation of interpolation pulses is started by the interpolator 20 for a command of the N20 block analyzed by the command analysis unit 10 at the timing of start of overlap. An acceleration/deceleration control unit 31 forms the acceleration/deceleration time constant Tc and the acceleration/deceleration type into linear shapes based on the setting, and exercises acceleration/deceleration control processing over the output of the interpolator 20 to output a speed pulse. At this time, the acceleration/deceleration control unit 30 is executing the acceleration/deceleration control processing of the interpolation pulse of the N10 block, and a total speed pulse of the acceleration/deceleration control unit 30 and the acceleration/deceleration control unit 31 added by an adder 50 is output to the servo control unit 40 (see <3> in FIG. 8).

If the acceleration/deceleration control processing of the interpolation pulse of the N10 block in the acceleration/deceleration control unit 30 is completed, the overlap is completed, and a speed pulse is of only the N20 block which is output from the acceleration/deceleration control unit 31 (see <4> in FIG. 8).

According to the technique described in JP 04-169907 A, the overlap of the different acceleration/deceleration time constants and different acceleration/deceleration types is realized by preparing a plurality of acceleration/deceleration control units as described above. However, even if command types (such as rapid traverse, cutting feed) are the same, when a plurality of settings of acceleration/deceleration exist for each of blocks, i.e., when acceleration/deceleration time constants and acceleration/deceleration types such as linear shapes or bell-shapes are changed depending upon command speed, if the method as described in JP 04-169907 A in which a plurality of acceleration/deceleration control units are provided is used, it is necessary to add processes by an increment of the number of settings of acceleration/deceleration so that the acceleration/deceleration control units can be executed in parallel. As a result, there is a problem that if the kinds of the acceleration/deceleration are increased, the process becomes complicated correspondingly, and a process load is increased. Further, resources are also required in proportion to the number of settings of the acceleration/deceleration, and it becomes difficult to realize. If only overlap between two blocks is considered, it is possible to realize by sequentially switching between the settings by two acceleration/deceleration control units, but if a state where overlaps of three blocks or more are generated is taken into account, a case where the number of the acceleration/deceleration control units is only two is insufficient.

SUMMARY OF THE INVENTION

Hence, in execution of a machining program, it is an object of the present invention to provide a numerical controller allowing overlapping of moving commands between arbitrary blocks irrespective of the setting of acceleration/deceleration of each of the blocks.

A numerical controller according to the present invention carries out acceleration/deceleration control over an interpolation pulse produced based on a command block, and includes: an acceleration/deceleration control unit which exercises acceleration/deceleration control processing over the interpolation pulse based on acceleration/deceleration setting corresponding to the command block, and which outputs a first speed pulse; and an overlapping shared acceleration/deceleration control unit which exercises acceleration/deceleration control processing over the first speed pulse based on overlapping shared acceleration/deceleration setting not depending on the command block, and which outputs a second speed pulse. The overlapping shared acceleration/deceleration control unit exercises acceleration/deceleration control processing over the first speed pulse such that a plurality of the command blocks overlap each other.

The acceleration/deceleration setting may include an acceleration/deceleration constant time setting or an acceleration/deceleration type setting.

The acceleration/deceleration setting may be associated with a command type of the command block and/or command speed of the command block.

According to the present invention, it becomes unnecessary to cause a plurality of acceleration/deceleration control units to operate in parallel, in execution of a machining program, so that it is unnecessary to impose limitations on the kind of acceleration/deceleration. Therefore, it is possible to provide a numerical controller allowing overlapping of moving commands between arbitrary blocks irrespective of the setting of acceleration/deceleration of each of the blocks, thereby allowing the machining time to be shortened.

BRIEF DESCRIPTION OF THE DRAWINGS

These and other objects and features of the present invention will become apparent by the following description of examples with reference to the accompanying drawings, wherein:

FIG. 8 is a diagram for describing conventional overlapping processing between two blocks having different acceleration/deceleration settings.

DETAILED DESCRIPTION OF THE PREFERRED EMBODIMENTS

Embodiments of the present invention will be described using the drawings. The same reference signs as those of the conventional techniques will be allocated to configurations of the invention, and the configurations of the invention will be described below.

Figure 1:
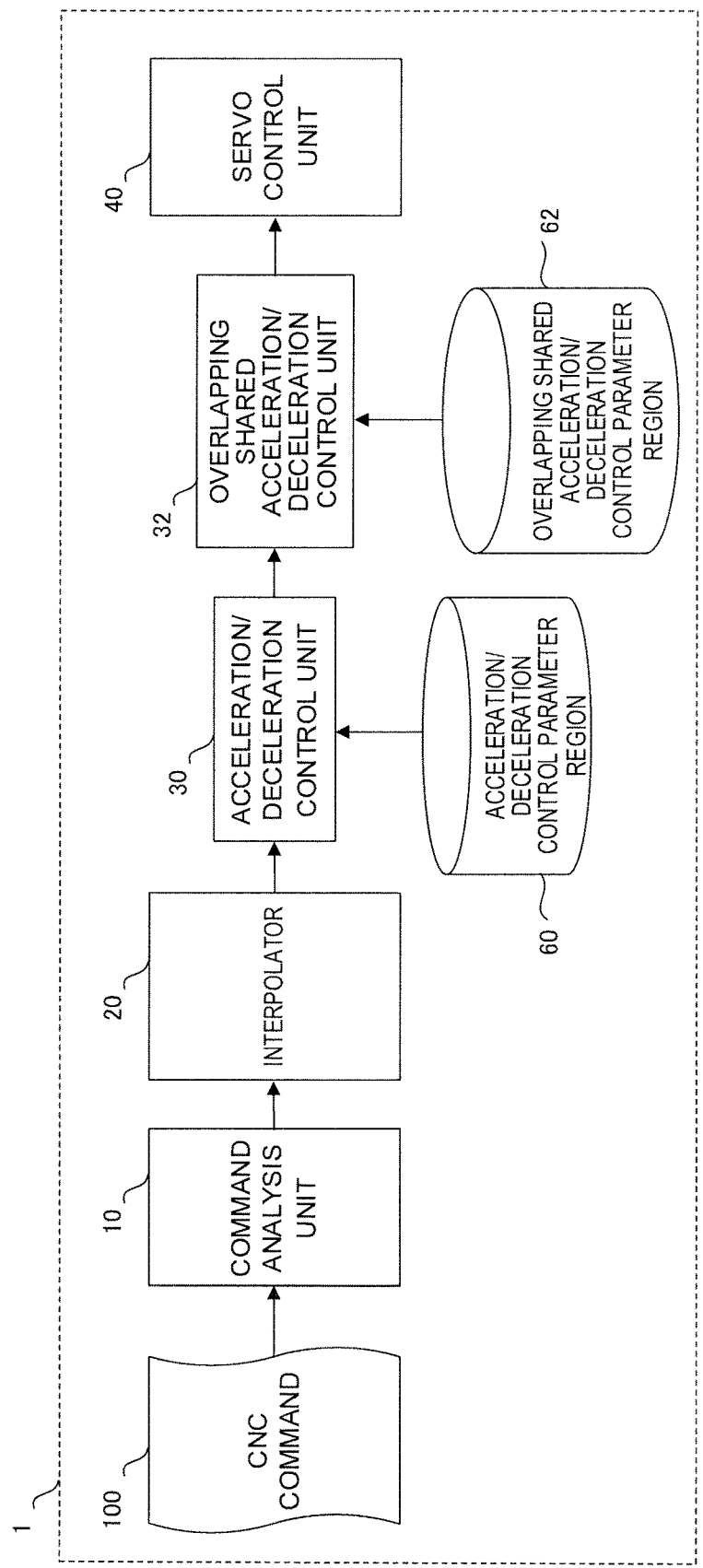
FIG. 1 is a function block diagram of a numerical controller according to an embodiment of the present invention.

FIG. 1 is a function block diagram of a numerical controller according to an embodiment of the invention. The numerical controller 1 includes a command analysis unit 10, an interpolator 20, an acceleration/deceleration control unit 30, an overlapping shared acceleration/deceleration control unit 32 and a servo control unit 40.

The command analysis unit 10 analyzes command blocks included in a CNC command 100, and outputs command data concerning movement of a drive unit (not shown). The interpolator 20 executes interpolation process based on command data which is output by the command analysis unit 10, and produces an interpolation pulse which is distributed in each of interpolation cycles.

The acceleration/deceleration control unit 30 exercises acceleration/deceleration control processing over interpolation pulses produced by the interpolator 20 based on an acceleration/deceleration control parameter which is set in an acceleration/deceleration control parameter region 60 provided on a memory (not shown) in the numerical controller 1, and the acceleration/deceleration control unit 30 produces a speed pulse. Set values such as an acceleration/deceleration time constant and an acceleration/deceleration type (such as linear shape and bell-shape) are included in the acceleration/deceleration control parameter, and the acceleration/deceleration control parameter is dynamically set in the acceleration/deceleration control parameter region 60 based on such as command speed and a command type (such as rapid traverse and cutting feed) of a command which becomes a basis of the interpolation pulse to be processed by the acceleration/deceleration control unit 30. The set value which becomes a basis of the acceleration/deceleration control parameter to be set in the acceleration/deceleration control parameter region 60 is previously stored in a table in association with such as a command type (such as rapid traverse, cutting feed) and command speed in a setting region in a memory (not shown) of the numerical controller 1, or the set value is set using a function using an argument such as the command type (such as rapid traverse, cutting feed) and the command speed. Based on the setting, acceleration/deceleration setting parameters of the acceleration/deceleration control parameter region 60 are set.

The overlapping shared acceleration/deceleration control unit 32 exercises overlapping shared acceleration/deceleration control processing over the speed pulse produced by the acceleration/deceleration control unit 30, based on the overlapping shared acceleration/deceleration control parameters which are set in the overlapping shared acceleration/deceleration control parameter region 62 provided on a memory (not shown) in the numerical controller 1, and produces the speed pulse. A set values such as an acceleration/deceleration time constant and an acceleration/deceleration type (such as linear shape and bell-shape) is included the overlapping shared acceleration/deceleration control parameter, the set value is predetermined as a common parameter irrespective of command speed or a command type (such as rapid traverse, cutting feed) of a command which becomes a basis of a speed pulse processed by the overlapping shared acceleration/deceleration control unit 32, and the set value is set in the overlapping shared acceleration/deceleration control parameter region 62.

The servo control unit 40 controls the drive unit such as a servomotor based on the speed pulse which is output by the overlapping shared acceleration/deceleration control unit 32.

In the numerical controller 1 having the above-described configuration, examples for carrying out the overlap between two blocks having different acceleration/deceleration settings will be shown below.

First, a first example of the overlapping processing between blocks will be described using FIG. 2.

In this example, overlap is carried out between two blocks having different acceleration/deceleration settings. In FIG. 2, an acceleration/deceleration time constant of a rapid traverse command (G00) is Tr', an acceleration/deceleration time constant of a cutting feed command (such as G01, G02 and G03) is Tc', and acceleration/deceleration types of both blocks are set to linear acceleration/deceleration. When an overlapping shared acceleration/deceleration time constant of the overlapping shared acceleration/deceleration control parameter is set to Tov, the numerical controller 1 controls a machine tool based on a later-described program O0001, and operations of the interpolator 20, the acceleration/deceleration control unit 30, and the overlapping shared acceleration/deceleration control unit 32 as well as an output of the overlapping shared acceleration/deceleration control unit 32 when the N10 block and the N20 block overlap each other are shown in a timing chart in FIG. 2.

O0001;
N10 G00 X100.;
N20 G01 X150. F500.;
M30;

First, for a command of the N10 block analyzed in the command analysis unit 10, forming operation of an interpolation pulse is started by the interpolator 20. At this time, for an acceleration/deceleration control parameter which is set in the acceleration/deceleration control parameter region 60, an acceleration/deceleration time constant is set to Tr', and the acceleration/deceleration type is set to a linear shape. The acceleration/deceleration control unit 30 sets an acceleration/deceleration time constant to Tr' based on the acceleration/deceleration control parameter which is set in the acceleration/deceleration control parameter region 60, sets the acceleration/deceleration type to a linear shape, and exercises acceleration/deceleration control processing over an output of the interpolator 20 to produce a speed pulse (time section <1> in FIG. 2).

The overlapping shared acceleration/deceleration control unit 32 exercises acceleration/deceleration control over a speed pulse which is output from the acceleration/deceleration control unit 30, and outputs the speed pulse. The overlapping shared acceleration/deceleration control unit 32 sets the overlapping shared acceleration/deceleration time constant to Tov based on the overlap acceleration/deceleration control parameters which are set in the overlapping shared acceleration/deceleration control parameter region 62, sets the acceleration/deceleration type to a linear shape, and exercises acceleration/deceleration control processing over an output of the acceleration/deceleration control unit 30. By combining linear acceleration/deceleration sets in two stages, the entire acceleration/deceleration control unit operates as a bell-shaped acceleration/deceleration (time section <1> in FIG. 2).

Output of the interpolation pulse of the N10 block is completed in the interpolator 20. At this time, the acceleration/deceleration control unit 30 is exercising the acceleration/deceleration control over the interpolation pulse of the N10 block, and the overlapping shared acceleration/deceleration control unit 32 is exercising the acceleration/deceleration control over the speed pulse of the N10 block which is output by the acceleration/deceleration control unit 30 (time section <2> in FIG. 2).

The acceleration/deceleration control of the interpolation pulse of the N10 block is completed in the acceleration/deceleration control unit 30. At the time, the overlapping shared acceleration/deceleration control unit 32 is still exercising the acceleration/deceleration control over the speed pulse of the N10 block which is output by the acceleration/deceleration control unit 30. Since the acceleration/deceleration control over the interpolation pulse of the N10 block of the acceleration/deceleration control unit 30 is completed, regarding the setting of the acceleration/deceleration control parameter in the acceleration/deceleration control parameter region 60, an acceleration/deceleration time constant is set to Tc', and the acceleration/deceleration type is changed to a linear shape (time section <3> in FIG. 2).

Next, concerning a command of the N20 block which is analyzed by the command analysis unit 10, forming operation of an interpolation pulse is started by the interpolator 20. The acceleration/deceleration control unit 30 sets an acceleration/deceleration time constant to Tc' based on the acceleration/deceleration control parameter which is set in the acceleration/deceleration control parameter region 60, sets the acceleration/deceleration type to a linear shape, exercises acceleration/deceleration control over the interpolation pulse which is output from the interpolator 20, and outputs speed pulses. At this time, since speed pulses of the N10 block and the N20 block are continuously stored on a buffer (not shown) used for the acceleration/deceleration control processing of the overlapping shared acceleration/deceleration control unit 32, these speed pulses are collectively subjected to the acceleration/deceleration control, and speed pulses based on the N10 block and the N20 block are mixed and output to the servo control unit 40 (time section <3> in FIG. 2).

Figure 2:
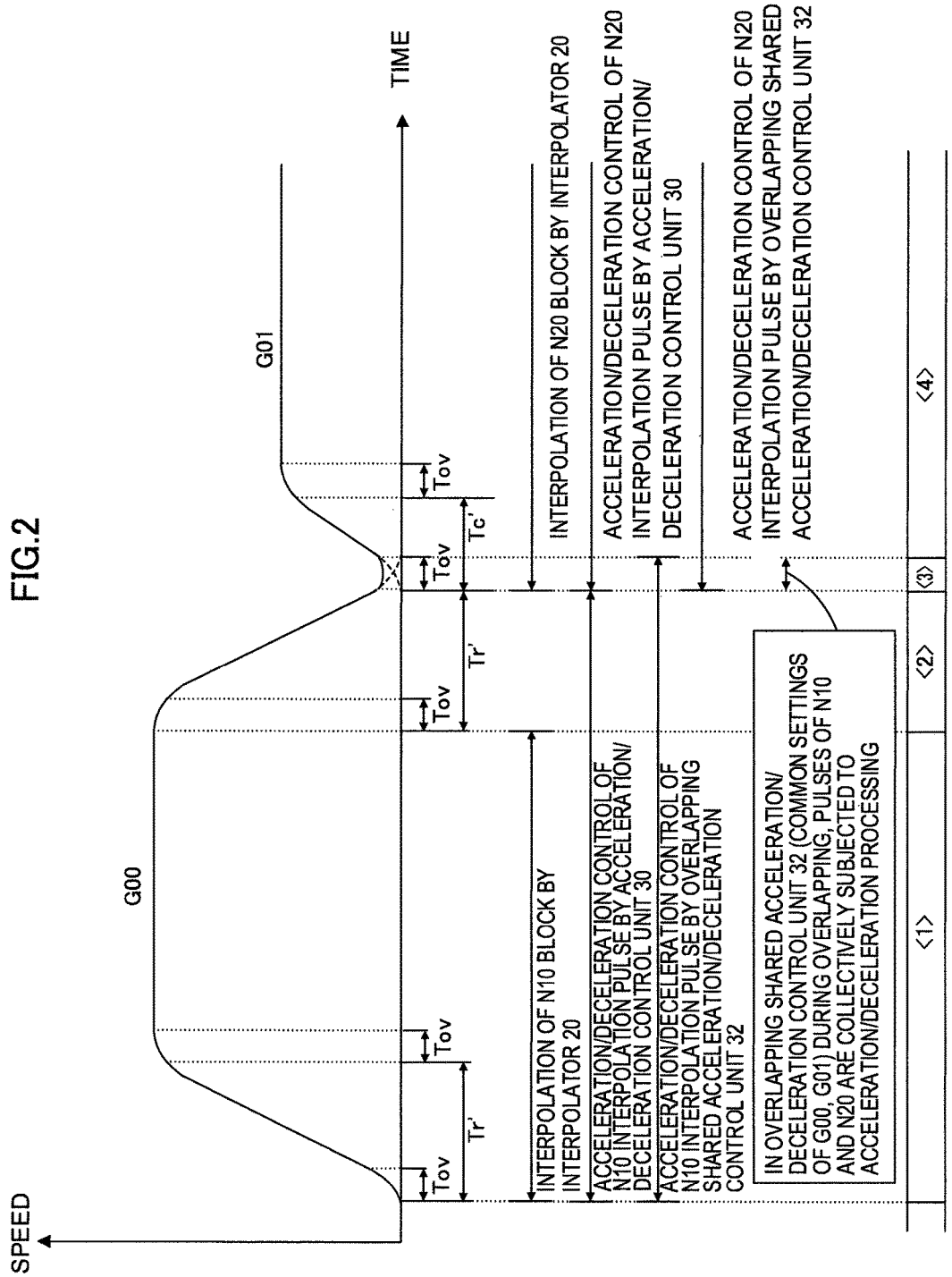
FIG. 2 is a diagram for describing a first example of overlapping processing between blocks which is carried out using the numerical controller shown in FIG. 1.

If the acceleration/deceleration control processing of the speed pulse of the N10 block in the overlapping shared acceleration/deceleration control unit 32 is completed, the overlapping processing between the blocks is completed, and the acceleration/deceleration processing for the speed pulse of the N20 block is continued (time section <4> in FIG. 2).

Next, a second example of the overlapping processing between blocks will be described using FIG. 3.

In the above-described first example, two blocks having different acceleration/deceleration settings overlap each other, but in this second example, three blocks having different acceleration/deceleration settings overlap each other.

In this example, acceleration/deceleration time constants of a rapid traverse command (G00), a rapid traverse based on a machine coordinate command (G53) and a cutting feed command (such as G01, G02 and G03) are set to different values. Operations of the interpolator 20, the acceleration/deceleration control unit 30 and the overlapping shared acceleration/deceleration control unit 32, as well as an output of the overlapping shared acceleration/deceleration control unit 32 when the numerical controller 1 controls the machine tool based on later-described program O0002, and the N10 block, the N20 block and an N30 block overlap each other, are shown in a timing chart shown in FIG. 3.

O0002;
N10 G00 X100.;
N20 G53 X120.;
N30 G01 X150. F500.;
M30;

In the program O0002, execution time of the N20 block is set to be extremely short. When the execution time of the N20 block is extremely short, while a speed pulse of the N10 block is subjected to the acceleration/deceleration control in the overlapping shared acceleration/deceleration control unit 32, the speed pulse of the N20 block and a speed pulse of the N30 block are continuously buffered and therefore, three blocks, i.e., the N10 block, the N20 block and the N30 block, overlap each other.

Figure 7:
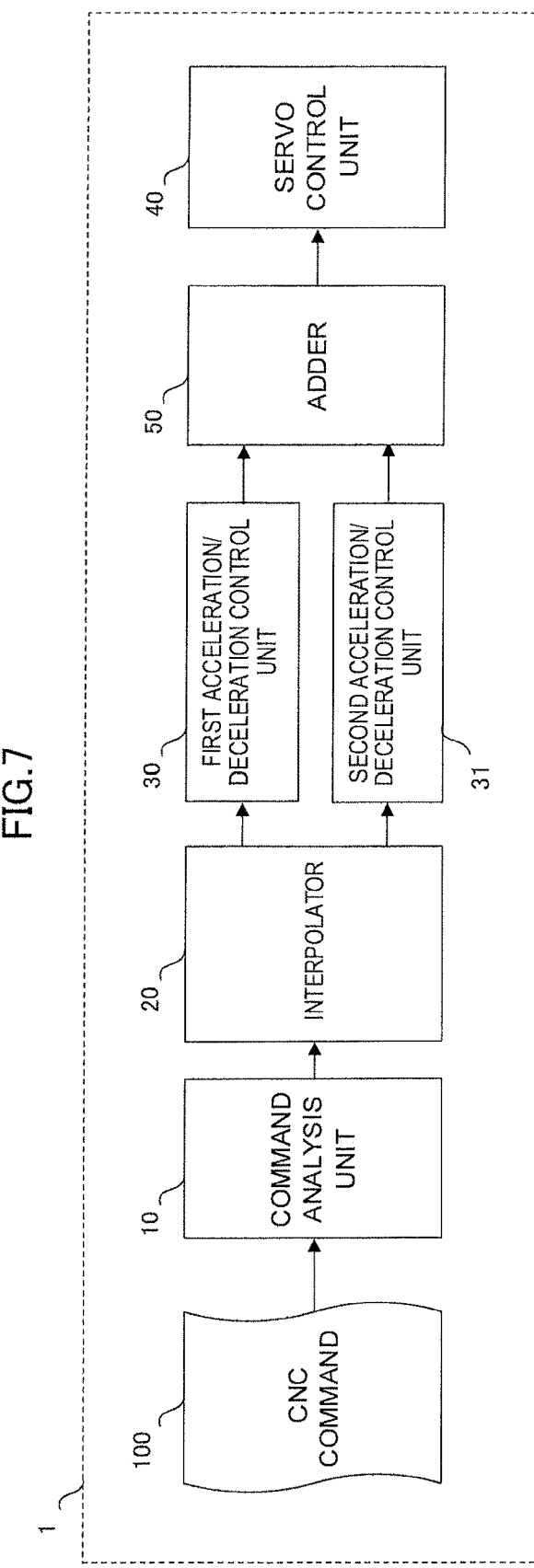
FIG. 7 is a function block diagram of a conventional numerical controller which uses two acceleration/deceleration control units in parallel.

To adapt the conventional technique (FIG. 7) to overlapping processing between three blocks, it is necessary to increase the number of acceleration/deceleration control units which execute in parallel, to three. In principle, the overlapping processing between blocks can be executed irrespective of the number of blocks. Therefore, it is necessary to increase the number of the acceleration/deceleration control units by an increment of the number of kinds of acceleration/deceleration. Whereas, according to the present invention, it is unnecessary to increase the number of the acceleration/deceleration control unit, not limiting the number of blocks to be overlapped.

First, concerning a command of the N10 block analyzed in the command analysis unit 10, forming operation of an interpolation pulse is started by the interpolator 20. At this time, an acceleration/deceleration control parameter for a G00 command is set in the acceleration/deceleration control parameter region 60. The acceleration/deceleration control unit 30 exercises acceleration/deceleration control over an output of the interpolator 20 based on the acceleration/deceleration control parameter (for G00) which is set in the acceleration/deceleration control parameter region 60, and produces a speed pulse (time section <1> in FIG. 3).

A pulse which is output from the acceleration/deceleration control unit 30 is subjected to the acceleration/deceleration control by the overlapping shared acceleration/deceleration control unit 32, and a speed pulse is output. The overlapping shared acceleration/deceleration control unit 32 exercises acceleration/deceleration control processing over an output of the acceleration/deceleration control unit 30 based on the overlap acceleration/deceleration control parameter which is shared between arbitrary blocks and which is set in the overlapping shared acceleration/deceleration control parameter region 62 (time section <1> in FIG. 3).

Output of the interpolation pulse of the N10 block is completed in the interpolator 20. At this time, the acceleration/deceleration control unit 30 is exercising acceleration/deceleration control over the interpolation pulse of the N10 block, and the overlapping shared acceleration/deceleration control unit 32 is exercising acceleration/deceleration control over the speed pulse of the N10 block which is output by the acceleration/deceleration control unit 30 (time section <2> in FIG. 3).

The acceleration/deceleration control of the interpolation pulse of the N10 block is completed in the acceleration/deceleration control unit 30. At this time, the overlapping shared acceleration/deceleration control unit 32 is still exercising the acceleration/deceleration control over the speed pulse of the N10 block which is output by the acceleration/deceleration control unit 30. Since the acceleration/deceleration control carried out by the acceleration/deceleration control unit 30 for the interpolation pulse of the N10 block is completed, setting of the acceleration/deceleration control parameter of the acceleration/deceleration control parameter region 60 is changed to acceleration/deceleration settings for G53 (time section <3> in FIG. 3).

Next, concerning a command of the N20 block analyzed by the command analysis unit 10, forming operation of interpolation pulses is started by the interpolator 20. The acceleration/deceleration control unit 30 exercises acceleration/deceleration control over the interpolation pulse which is output from the interpolator 20, based on the acceleration/deceleration control parameter (for G53) which is set by the acceleration/deceleration control parameter region 60, and outputs speed pulses. At this time, since speed pulses of the N10 block and the N20 block are continuously stored on the buffer (not shown) which is used for the acceleration/deceleration control processing of the overlapping shared acceleration/deceleration control unit 32, these speed pulses are collectively subjected to the acceleration/deceleration control, and the speed pulses based on the N10 block and the N20 block are mixed and output to the servo control unit 40 (time section <4> in FIG. 3).

Further, if acceleration/deceleration control over the interpolation pulse of the N20 block in the acceleration/deceleration control unit 30 is completed before the acceleration/deceleration control of the interpolation pulse of the N10 block in the overlapping shared acceleration/deceleration control unit 32 is completed, execution of acceleration/deceleration control over an interpolation pulse of the N30 block is started. At this time, since speed pulses of the N10 block, the N20 block and the N30 block which are output by the acceleration/deceleration control unit 30 are continuously stored on the buffer (not shown) used for the acceleration/deceleration control processing of the overlapping shared acceleration/deceleration control unit 32, these speed pulses are collectively subjected to the acceleration/deceleration control, and the speed pulses based on the N10 block, the N20 block and the N30 block are mixed and output to the servo control unit 40 (time section <5> in FIG. 3).

Figure 3:
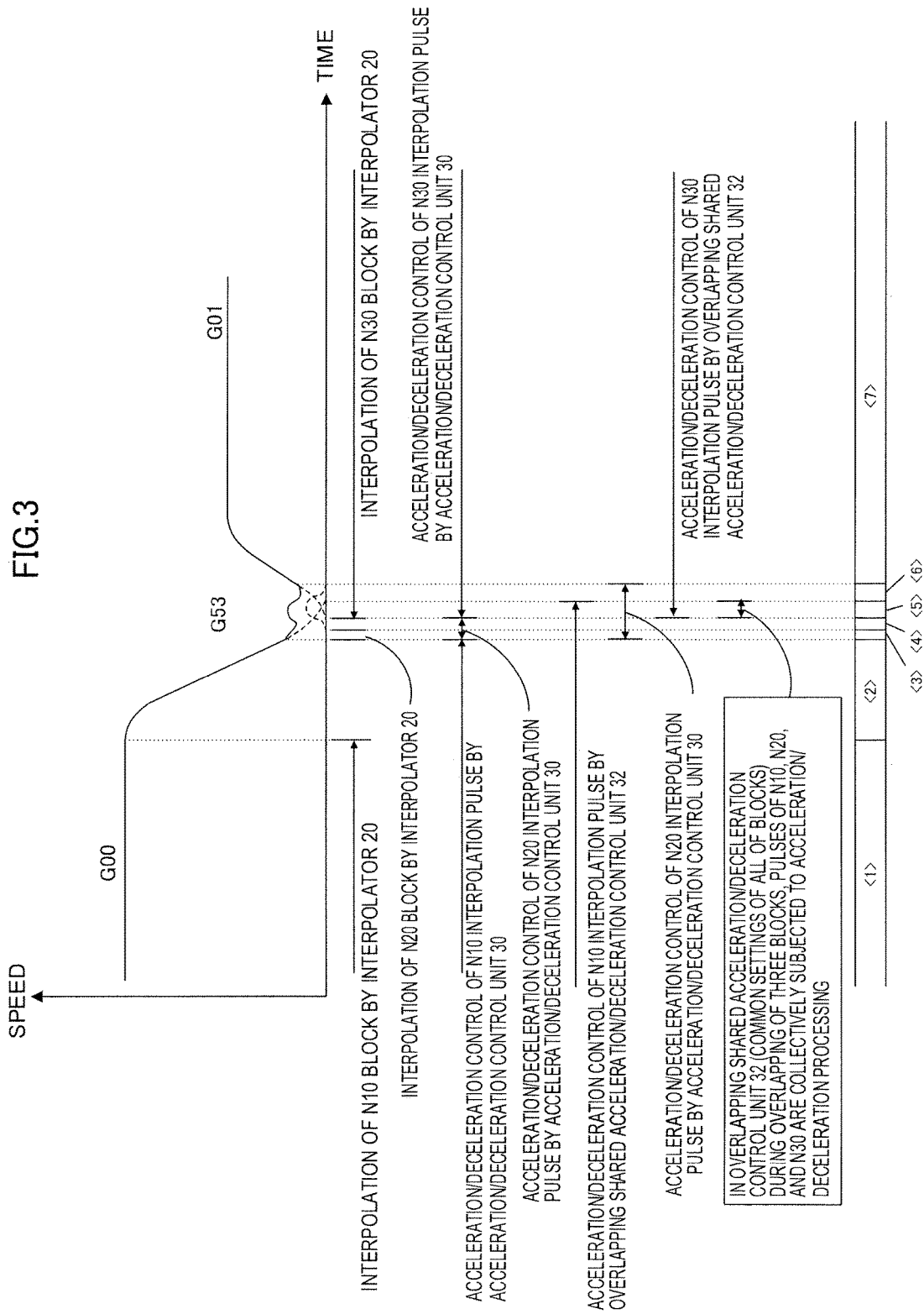
FIG. 3 is a diagram for describing a second example of the overlapping processing between blocks which is carried out using the numerical controller shown in FIG. 1.

If the acceleration/deceleration control processing over the speed pulse of the N10 block in the overlapping shared acceleration/deceleration control unit 32 is completed, the acceleration/deceleration processing which overlaps the speed pulses of the N20 block and the N30 block is continued (time section <6> in FIG. 3). Thereafter, if the acceleration/deceleration control processing of the speed pulse of the N20 block is completed, the overlapping processing between the blocks is completed, and the acceleration/deceleration processing of the speed pulse of the N30 block is continued (time section <7> in FIG. 3).

Next, a third example of the overlapping processing between blocks will be described using FIG. 4.

Figure 5:
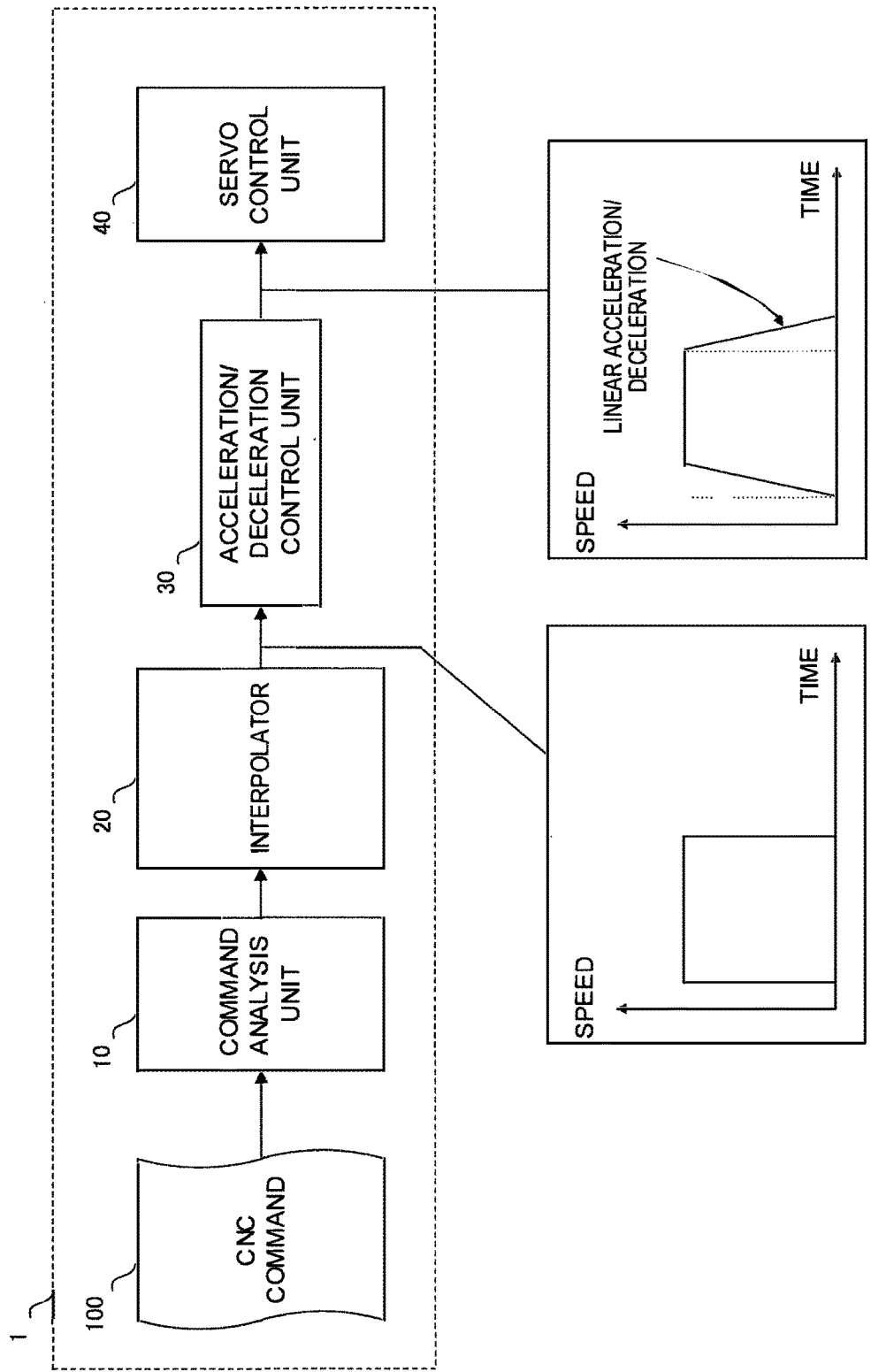
FIG. 5 is a function block diagram of a conventional numerical controller which controls acceleration/deceleration.
Figure 6:
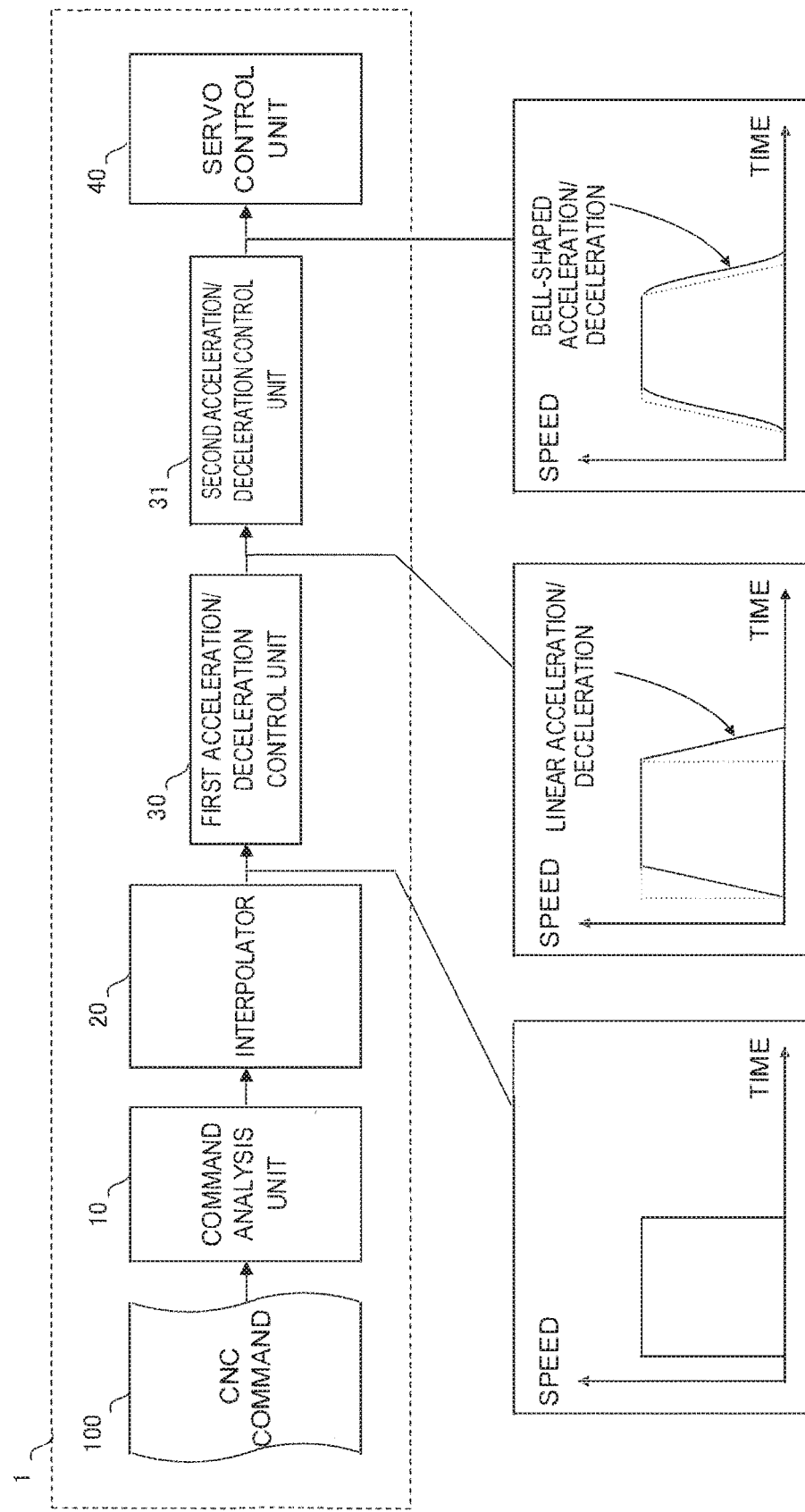
FIG. 6 is a function block diagram of a conventional numerical controller which controls acceleration/deceleration in two stages.

In the third example, a time constant to be overlapped is set such that a time constant in acceleration/deceleration control to be carried out by a general numerical controller as shown in FIG. 5, for example, is not totally changed. Hence, in the setting of the time constant which is to be overlapped according to the third example, time which is desired to be overlapped by the time constant of the overlapping shared acceleration/deceleration control parameter is allocated to a setting time constant in conventional acceleration/deceleration control so that entire time constant to be set is not changed as compared with a time constant in the conventional acceleration/deceleration control.

Specifically, according to the third example, as compared with the conventional acceleration/deceleration control using the numerical controller shown in FIG. 5, it is possible to designate overlap time using the numerical controller shown in FIG. 1 without changing the entire time constant. This will be described using FIG. 4.

Figure 4:
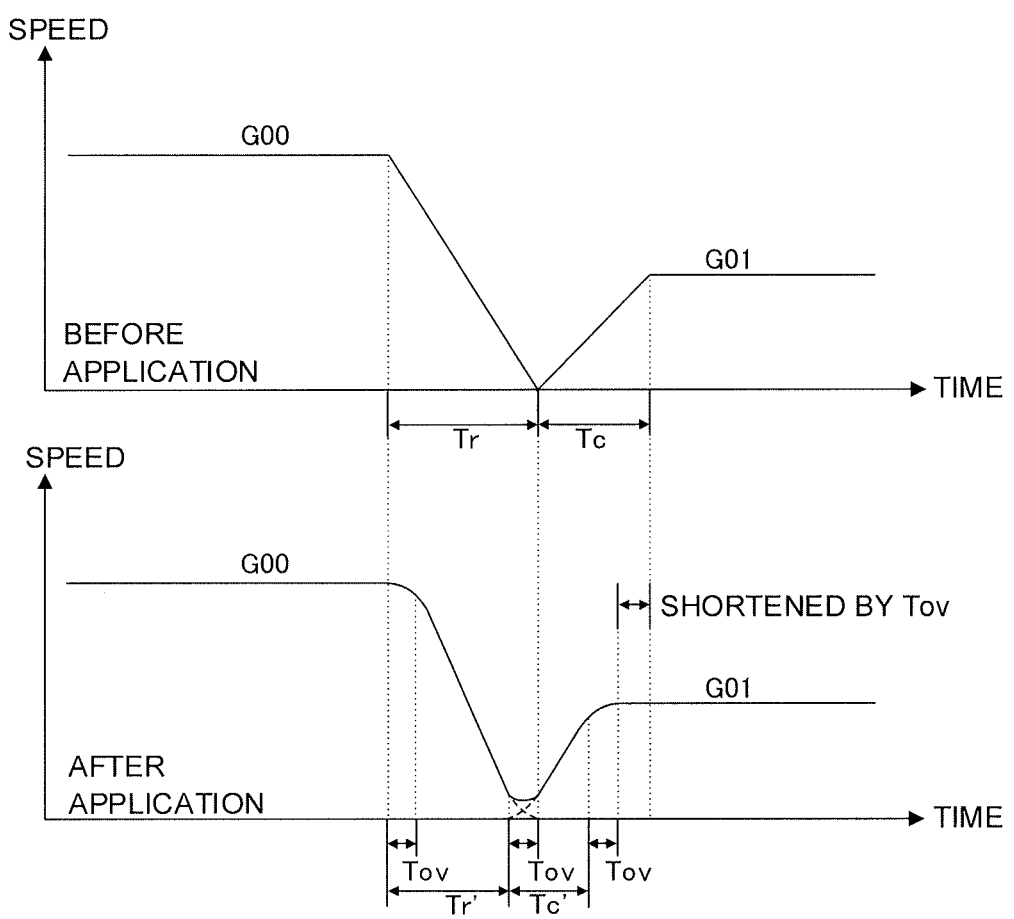
FIG. 4 is a diagram for describing a third example of the overlapping processing between blocks which is carried out using the numerical controller shown in FIG. 1.

An upper graph in FIG. 4 is a graph showing an output of speed pulses of rapid traverse and cutting feed which were subjected to conventional acceleration/deceleration control. An acceleration/deceleration time constant of rapid traverse (G00) is Tr, an acceleration/deceleration time constant of the cutting feed (such as G01, G02 and G03) is Tc, and acceleration/deceleration types thereof are set to linear acceleration/deceleration.

In the setting of the time constants to be overlapped according to the third example using the numerical controller having a configuration shown in FIG. 1, the acceleration/deceleration time constant of the rapid traverse (G00) is set to Tr', the acceleration/deceleration time constant of the cutting feed (such as G01, G02 and G03) is set to TC' as shown in a lower graph in FIG. 4, and the acceleration/deceleration types thereof are set to the linear acceleration/deceleration. Further, a time constant of the overlap common acceleration/deceleration parameter which is set in the overlapping shared acceleration/deceleration control parameter region 62 (FIG. 1) is set to Tov. Then, by setting the time constants Tr' and Tc' to satisfy the following equations (1), a speed pulses are output as shown in the lower graph in FIG. 4. According to this, the entire time is shortened by the overlapped time Tov without changing the substantial time constants (Tr'+Tov (=Tr); Tc'+Tov (=Tc)) of the rapid traverse command (G00) and cutting feed command (such as G01, G02 and G03) as compared with the case (Tr and Tc) of the conventional acceleration/deceleration control, and it is possible to carry out the overlapping processing between blocks such that the entire time constants are not changed between before and after the application.

$Tr'=Tr-Tov$ $Tc'=Tc-Tov$ (1)

The invention claimed is:

1. A numerical controller for carrying out acceleration/deceleration control, the numerical controller configured to control a machine tool and comprising a processor and memory configured to perform the method comprising:
   analyzing a first command block and a second command block of a plurality of command blocks of a machining program;
   producing a first interpolation pulse by an interpolator based on the analyzed first command block and a second interpolation pulse by the interpolator based on the analyzed second command block;
   controlling the first interpolation pulse to produce a first speed pulse by exercising acceleration/deceleration control processing based on a first acceleration/deceleration setting corresponding to the analyzed first command block;
   exercising acceleration/deceleration control processing over the first speed pulse based on an overlapping shared acceleration/deceleration parameter irrespective of command speeds and command types of the plurality of command blocks to control an output of a modified first speed pulse, wherein the acceleration/deceleration control processing over the first speed pulse causes speed pulses produced based on the first and second command blocks to overlap each other; and
   controlling the machine tool based on the output of the modified first speed pulse, which causes the machine tool having a shortened machining time.

2. The numerical controller according to claim 1, wherein the first acceleration/deceleration setting includes at least one of an acceleration/deceleration constant time setting and an acceleration/deceleration type setting.

3. The numerical controller according to claim 1, wherein the first acceleration/deceleration setting is associated with at least one of a command type of the analyzed command block and a command speed of the analyzed first command block.

4. The numerical controller according to claim 2, wherein the first acceleration/deceleration setting is associated with at least one of a command type of the analyzed first command block and a command speed of the analyzed first command block.

5. The numerical controller according to claim 1, wherein the processor and memory are configured to perform the method comprising:
   controlling the second interpolation pulse to produce a second speed pulse by exercising acceleration/deceleration control processing based on a second acceleration/deceleration setting corresponding to the analyzed second command block;
   exercising acceleration/deceleration control processing over the second speed pulse based on the overlapping shared acceleration/deceleration parameter to control an output of a modified second speed pulse; and
   controlling the machine tool based on the output of the modified second speed pulse.

* * * * *